United States Patent Office 3,336,960
Patented Aug. 22, 1967

3,336,960
PROCESS OF PEELING FOOD PRODUCTS
Karel Popper, Albany, and Fredoon S. Nury and William L. Stanley, Richmond, Calif., assignors to the United States of America as represented by the Secretary of Agriculture
No Drawing. Filed Nov. 2, 1964, Ser. No. 408,439
7 Claims. (Cl. 146—235)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for peeling vegetative produce, as for example, fruits, vegetables, nuts, and grains.

In industry it is conventional practice to peel various food products by mechanical methods, i.e., application of cutting or abrading devices. Peeling systems which involve contacting the food with lye (aqueous sodium hydroxide) are also widely used for potatoes, peaches and other fruit. Although lye peeling is a useful process, it is subject to several limitations. For example, it is ineffective with certain products, for instance, onions, garlic, and chestnuts. Another point is that the disposal of spent lye is a problem in food processing plants. This is due to the fact that the lye contains a large proportion of organic matter extracted from the food products and if it is run into a stream it will cause water pollution.

In accordance with the invention, a peeling technique is employed which involves exposing the product to hydrogen chloride gas. This gas may be supplied from commercial tanks or even more simply from a pool of hydrochloric acid. Thus for example the products may be placed in a vessel which contains concentrated hydrochloric acid, using a supporting device, such as a screen or slats, to prevent the products from contacting the liquid acid but allowing them to be contacted by the fumes of the acid. During such exposure, the binding substances within the peel and those which hold the peel to the product flesh are hydrolyzed or otherwise destroyed with the result that the peel is loosened. Following exposure to the acid vapors, the loosened peel can be readily removed by applying mechanical action, as for example, brushing, spraying with water, tumbling in a rotating drum, shaking on a vibrating screen, applying rubbing action by passage through rubber rollers or by striking with rubber fingers, or various combinations of these. Prior to application of the mechanical action, or concurrent therewith, the product may be contacted with hot water or steam to aid in removing the loosened peel.

A primary advantage of the invention lies in its simplicity and effectiveness in yielding products in a clean, peel-free condition suitable for application of conventional processing operations such as canning, freezing, dehydration, etc. The effectiveness of the invention is particularly demonstrated by its ability to remove the peel from such products as ginger root and Jerusalem artichokes which because of their convoluted structure are difficult to peel by known techniques.

A particular advantage of the process of the invention lies in its versatility; it is not only operative with most of the fruits and vegetables which respond to lye peeling but even to products such as onions, garlic, and nuts which cannot be peeled satisfactorily by lye treatment. The very fact that the process is able to loosen the tough and woody shells of nuts is a completely surprising aspect of the invention.

Another important advantage of the process of the invention is that little, if any, material is extracted from the products being peeled. As a result there is no significant loss of nutrients and, moreover, the waste disposal problems incident to lye peeling are obivated. It may be noted that the peels removed by the instant process may be burned; any small amount of hydrogen chloride they may contain is vaporized during burning. We have made tests on the ash obtained by burning onion peels removed as herein described and found that it was not acid and contained but a trace of chlorides.

Since the peels of various products differ in such properties as thickness, chemical composition, woodiness, the degree to which they are bound to the flesh of the product, etc., the time of exposure to HCl vapors to obtain an adequate loosening of the peel will vary over a considerable range. Typical exposure times suitable for various products are shown in the examples below. It is evident from these data that products such as apples, carrots, onions, etc., which have a thin and non-woody peel require a lesser time of exposure than products such as nuts or cereals which have a very tough woody peel (or shell as it may be more apply termed). In processing any particular material, the optimum time of exposure may be determined in the following manner: The product is exposed to the HCl vapors and from time to time a sample of the product is removed from the system and examined—for example by rubbing with the fingers—to see whether or not the peel has been loosened so that it is readily removable. When the peel reaches a loose state, the process is terminated at once by withdrawing the products from the vessel where they had been exposed to the HCl vapors. To assist in short-stopping the peel-loosening effect the products may be sprayed with water or with a dilute solution of sodium bicarbonate. It is obvious that the contact with hydrogen chloride vapors should not be continued to such a point that the flesh of the product is damaged; by discontinuing the exposure when the peel is loosened, as above described, such an untoward effect is readily avoided.

Ordinarily the exposure to HCl vapors is conducted at ambient (room) temperature. However, the temperature is not critical and one can use temperatures above or below room temperatures. Elevated temperatures, for example those up to 100° C., may be desirable to expedite the peel-loosening effect. To attain such increased temperatures, one may supply heating coils, radiant heaters, or the like in the vessel in which the product is exposed to HCl vapors. In the alternative, one may mix steam with HCl vapors and apply the resulting hot gas mixture to the produce.

As noted hereinabove the process of the invention can be applied to a wide variety of materials, typically fruits such apples, pears, peaches, apricots, nectarines, etc.; vegetables such as onion, garlic, Jerusalem artichokes, turnips, carrots, beets, etc.; nuts such as walnuts, pecans, almonds, chestnuts, etc.; grains such as wheat, rice, barley, oats, corn, etc.; miscellaneous foods such as ginger root, water chestnuts, etc. The peel which is removed in accordance with the invention ranges from the papery tissues of onion and garlic through the tough rind of the pomes and includes even the woody shells of nuts and the tough fibrous bran coatings of the cereals. Accordingly, the expression "peel" and variants thereof used herein, are intended to be generic to all types of natural covering structures of plant materials including those which may be specifically considered as rind, peel, skin, shell, bran, hull, exocarp, epicarp, seed coat, pellicle, etc.

It is recognized that there are known procedures wherein fruits or vegetables are peeled by contact with certain acidic substances. Thus Ash (U.S. Patent 1,453,781) advocates the use of concentrated sulphuric acid or the fumes of sulphur trioxide. These agents, however, yield inferior results compared to those attained with hydrogen chloride vapors. Both sulphuric acid and sulphur trioxide are very powerful dehydrating agents and char organic matter very rapidly. Thus when these agents are applied to fruits or vegetables, charring of the flesh as well as the skins occurs. This charred material is very unsightly and difficult to remove from the products. Also, sulphuric acid and sulphur trioxide combine with various components of the fruit or vegetable tissue, notably sugars and proteins, forming sulphonates and other compounds which exhibit evil odors and taste. In contrast, hydrogen chloride does not cause charring but acts by hydrolyzing cellulosic and protein components forming smaller molecules which can easily be washed away from the treated product, leaving no residue which alters the natural taste or odor of the product. Thus since hydrogen chloride does not cause charring and since it acts by hydrolysis rather than by chemical combination with components of the plant tissue, it yields results far superior to those attained with sulphuric acid, sulphur trioxide, nitric acid, chromic acid, and the like.

The invention is further demonstrated by the following examples.

A series of runs were made on peeling various agricultural products using the following technique in each case: The base of a laboratory desiccator was filled with concentrated hydrochloric acid (37%) and a perforated porcelain plate was placed over the layer of acid. The agricultural product—apples or onions for example—was placed on the plate where it was out of contact with the liquid but could be readily contacted by the acid fumes. The top of the desiccator was put in place and the system allowed to stand at room temperature. When the peels had become loosened the products were taken out of the desiccator and the peels removed by mechanical action. Several techniques were used for this purpose. In some cases (a), the products were placed in a wire screen basket and shaken while spraying with water from the top to wash away the loosened peels. In other cases (b), the products were subjected to brushing to remove the loosened peels. In a third technique (c), the products were subjected to rubbing action, as by passage between rubber rollers. In a fourth technique (d), the products were subjected to dry shaking in a container.

The products to which the procedure was applied and the various conditions used are set forth below.

| Ex. | Produce | Time of exposure to HCl fumes to attain peel loosening without flesh damage, hours | Mechanical treatment to remove loosened peel* |
|---|---|---|---|
| 1 | Apple | 0.75-1 | a or b |
| 2 | Carrot | 0.25-0.5 | b |
| 3 | Chestnut | 12 | c |
| 4 | Garlic | 4-6 | a |
| 5 | Ginger root | 4 | c |
| 6 | Jerusalem artichoke | 4 | c |
| 7 | Onion, yellow globe | 4 | a |
| 8 | Onion, white boiling | 6 | a |
| 9 | Onion, red | 6 | a |
| 10 | Pecan | 24 | d |
| 11 | Walnut, English | 24 | d |
| 12 | Wheat, red | 4-6 | a, b, or c |

*Mechanical treatments: (a) Shaking and washing; (b) brushing; (c) rubbing; (d) dry shaking.

In all cases it was noted that an excellent peeling effect was attained and the products had a natural color, taste, and texture. Special remarks: In Example 4, the garlic was originally in the form of a natural bulb (a cluster of individual cloves); the product was separate cloves free from skins. In the case of Example 3 (chestnuts) the treatment removed not only the woody shell but also the seed coat (pellicle) normally on the nut meats; in the case of the other nuts (Examples 10 and 11) the woody shells were removed but the seed coat remained on the meats.

Having thus described our invention, we claim:

1. A process for peeling vegetative produce which comprises contacting the produce with the vapors of hydrogen chloride until the peel is loosened and removing the loosened peel.

2. The process of claim 1 wherein the produce is a vegetable.

3. The process of claim 1 wherein the produce is a vegetable of the genus Allium.

4. The process of claim 1 where the produce is a fruit.

5. The process of claim 1 wherein the produce is a nut.

6. The process of claim 1 wherein the produce is a root.

7. The process of claim 1 wherein the produce is a cereal grain.

References Cited
UNITED STATES PATENTS 1,453,781  5/1923  Ash _____ 146—233
1,718,332  6/1929  Cloer _____ 146—235 X

FOREIGN PATENTS 360,828  10/1922  Germany.
3,083    5/1867   Great Britain.

DONALD R. SCHRAN, *Primary Examiner*.